US009521517B2

(12) United States Patent
Best

(10) Patent No.: US 9,521,517 B2
(45) Date of Patent: *Dec. 13, 2016

(54) UTILIZING INFORMATION ABOUT MOBILE COMMUNICATION DEVICES WITH RESPECT TO AN AREA OF INTEREST

(71) Applicant: Trimble Navigation Limited, Sunnyvale, CA (US)

(72) Inventor: Gregory C. Best, San Francisco, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,021

(22) Filed: Feb. 18, 2016

(65) Prior Publication Data

US 2016/0165394 A1    Jun. 9, 2016

Related U.S. Application Data

(63) Continuation of application No. 14/585,014, filed on Dec. 29, 2014, now Pat. No. 9,307,385, which is a
(Continued)

(51) Int. Cl.
| | | |
|---|---|---|
| *G08B 1/08* | (2006.01) | |
| *H04W 4/02* | (2009.01) | |
| *G08G 1/0967* | (2006.01) | |
| *G08G 1/00* | (2006.01) | |
| *H04W 4/08* | (2009.01) | |
| *H04W 4/22* | (2009.01) | |

(52) U.S. Cl.
CPC ....... *H04W 4/021* (2013.01); *G08G 1/096775* (2013.01); *G08G 1/20* (2013.01); *H04W 4/08* (2013.01); *H04W 4/22* (2013.01)

(58) Field of Classification Search
CPC ... G08G 1/20; G08G 1/096775; H04W 4/021; H04W 4/08
USPC .............................. 340/539.1, 539.11, 539.19
See application file for complete search history.

(56) References Cited

U.S. PATENT DOCUMENTS

| 6,031,455 A | 2/2000 | Grube et al. |
| 6,574,561 B2 | 6/2003 | Alexander et al. |
| (Continued) | | |

OTHER PUBLICATIONS

U.S. Appl. No. 13/020,142, Final Office Action mailed on Aug. 5, 2013, 5 pages.

(Continued)

*Primary Examiner* — Daryl Pope
(74) *Attorney, Agent, or Firm* — Kilpatrick Townsend & Stockton LLP

(57) ABSTRACT

A method for establishing an approximate number of persons in an area of interest comprises providing a request to one or more communications providers that cover an area of interest. The request is for a listing of any mobile communication devices located within the area of interest. The listing of any mobile communication devices located within the area of interest is utilized to establish an approximate number of persons in the area of interest. In response to receipt of information that indicates a mobile communication device on the listing has departed the area of interest, the listing is updated to show the mobile communication device is clear of the area of interest.

20 Claims, 6 Drawing Sheets

Related U.S. Application Data continuation of application No. 13/020,142, filed on Feb. 3, 2011, now Pat. No. 8,947,225.

(56) References Cited

U.S. PATENT DOCUMENTS

| | | |
|---|---|---|
| 6,608,559 B1 | 8/2003 | Lemelson et al. |
| 6,868,340 B2 | 3/2005 | Alexander et al. |
| 7,411,493 B2 | 8/2008 | Smith |
| 7,508,840 B2 | 3/2009 | Delaney |
| 7,664,233 B1 | 2/2010 | Kirchmeier et al. |
| 7,724,130 B2 | 5/2010 | Norstrom et al. |
| 7,813,741 B2 | 10/2010 | Hendrey et al. |
| 8,947,225 B2 | 2/2015 | Best |
| 2010/0029243 A1 | 2/2010 | Ozer et al. |
| 2012/0202446 A1 | 8/2012 | Nichols et al. |
| 2013/0157684 A1* | 6/2013 | Moser .................. H04W 4/023 455/456.1 |
| 2015/0118990 A1* | 4/2015 | Best .................. G08G 1/096775 455/404.2 |
| 2015/0134418 A1* | 5/2015 | Leow .................. G06Q 30/0205 705/7.34 |

OTHER PUBLICATIONS

U.S. Appl. No. 13/020,142, Non-Final Office Action mailed on May 22, 2014, 5 pages.

U.S. Appl. No. 13/020,142, Non-Final Office Action mailed on Dec. 21, 2012, 9 pages.

U.S. Appl. No. 13/020,142, Notice of Allowance mailed on Oct. 2, 2014, 5 pages.

U.S. Appl. No. 14/585,014, Non-Final Office Action mailed on Aug. 13, 2015, 6 pages.

U.S. Appl. No. 14/585,014, Non-Final Office Action mailed on Feb. 13, 2015, 6 pages.

U.S. Appl. No. 14/585,014, Notice of Allowance mailed on Dec. 9, 2015, 6 pages.

* cited by examiner

UTILIZING INFORMATION ABOUT MOBILE COMMUNICATION DEVICES WITH RESPECT TO AN AREA OF INTEREST

CROSS-REFERENCE TO RELATED APPLICATIONS (CONTINUATION)

This application is a continuation application of and claims priority to and benefit of co-pending U.S. patent application Ser. No. 14/585,014, filed on Dec. 29, 2014, entitled "Utilizing Information About Mobile Communication Devices With Respect To An Area Of Interest," by Gregory C. Best, and assigned to the assignee of the present application.

U.S. patent application Ser. No. 14/585,014 is a continuation application of and claimed priority to and benefit of co-pending U.S. patent application Ser. No. 13/020,142, filed on Feb. 3, 2011, entitled "PROVIDING INFORMATION ABOUT MOBILE COMMUNICATION DEVICES WITH RESPECT TO AN AREA OF INTEREST," by Gregory C. Best, and assigned to the assignee of the present application.

FIELD

The invention relates to information about mobile communication devices with respect to an area of interest, particularly when an important event may have occurred or is about to occur in that area.

BACKGROUND

During an emergency event, there is need to identify people within the area of the emergency. This problem is normally addressed by emergency and rescue crews searching through rubble, questioning bystanders, survivors, and the like. As such, this process can be quite time consuming and it is not uncommon for a lot of time to be spent searching an area in a grid pattern or other logically laid out search method.

However, one problem with a logical search pattern is that the first areas being searched may or may not have any persons therein while another location lower on the search area order may have people trapped therein. Further, the grid search may place emergency workers in peril while searching a location that has no persons therein.

In addition, in some cases, it may be hours or even days before the emergency workers have a clear idea of who and how many people they should be expecting to find. This lack of knowledge can be detrimental and has been known to cause a secondary search event to occur after it is ascertained that a person or persons remain unaccounted for in the emergency area.

SUMMARY OF THE INVENTION

Embodiments provided herein recite methods and systems for providing information about mobile communication devices with respect to an area of interest are disclosed. Initially, information about an event having an area of interest is received. A request is provided to one or more communications providers that cover the area of interest for a listing of any mobile communication devices located within the area of interest. The listing of any mobile communication devices located within the area of interest is utilized to establish an approximate number of persons in the area of interest.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF EMBODIMENTS

Figure 1:
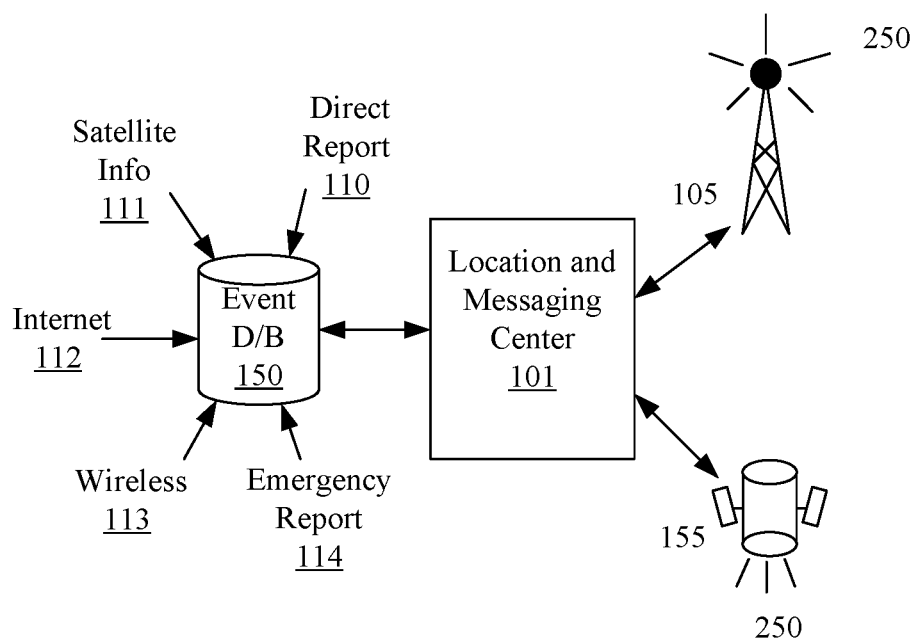
FIG. 1 is a block diagram of an event data collection system with a location and messaging controller in accordance with an example of the present technology.

Embodiments disclosed herein provide location information for personal mobile devices and vehicles in an area of interest. In one embodiment, for purposes of providing direction or responding to an area of interest, each personal mobile device may be considered equivalent to at least one individual. In other words, since a mobile device is usually located close to, or carried by a user, the location of the mobile device is utilized herein to provide the location of at least one person.

Overview

By utilizing one or more of the embodiments provided herein, numerous location knowledge benefits are gained. These benefits include the ability to quickly establish how many persons may be in an area of interest as well as specific or semi-specific locations of the persons within the area of interest. In addition, a clear benefit is provided to the device owner. For example, trapped people, such as people inside a burning building or within an active-shooter scenario, may be found more quickly, may receive a message or the like that includes directions, actions to take, situational updates, medical advice, etc.

Moreover, situational reports may be received from within the area of interest. In one embodiment, the information may be received from the persons within or approximate to the area of interest. For example, a person within an area of interest can provide real time information about the area of interest. The information may include status information about the area of interest such as fire size, location, damage, structure issues, environmental conditions, etc. In addition, the provided information may include personal information such as, but not limited to, injury information, number and location of other people within the area of interest, special needs information, any immediate needs, any short term needs, perceived level of danger, requests for medical guidance, contact information for others persons that may be unaccounted for or out of contact, and the like.

Moreover, information may also be gathered from other sources with respect to the area of interest. For example, satellite imagery, local web cameras, road cameras, security cameras, utility company information and status, social networking information such as images, videos, text messages and the like which may be uploaded to the Internet by a device within the area of interest or about the area of interest, and the like. Radio and television broadcasts also may yield valuable information. Further, in one embodiment information about response capabilities may also be gathered.

Although terms such as personnel and persons are used herein. It should be understood that in a scenario there may be numerous types of personnel and persons that may benefit from both sides of the present technology. These personnel types may include response types, bystander types, active participant types and the like. For example, response personnel may include any person or persons that respond to an event and utilize the location information to generate rescue plans, action plans, evacuation plans, clean-up plans, and the like. Bystander personnel may include any person or persons that are in, or heading toward, the wrong place at the wrong time. For example, bystander personnel may be civilians, victims, potential victims, and the like. In one embodiment, the term active participant types refer to a person or persons that may be the cause of the event, causing the event or enhancing the event. For example, an active participant may be an arsonist, shooter, protestor, rioter, or the like.

With reference now to FIG. 1, a block diagram of an event data collection system with a location and messaging controller in accordance with an example of the present technology. In one example, event data collection system 100 includes an event database 150 and a location and messaging center 101.

For purposes of clarity in the following discussion, event database 150 is populated and updated with information that pertains to an event. In general, an event may be occurring, such as a fire, earthquake, flood, etc. However, in other cases, the event may have already occurred, such as a structure collapse, fire, flood, car crash, sink hole, toxin release, etc. In yet other cases, the event may be a forecasted event. That is, the event may have not yet have occurred or not yet occurred at the area of interest. Examples of a forecasted event include, but are not limited to, wildfire, a weather event such as landfall of a hurricane, tornado, tsunami, imminent structural collapse, and the like. Electronic signals sent from an earthquake monitoring station will out-pace the shockwave which can also provide advance notice of the coming danger.

In one embodiment, event database 150 includes data from a plurality of sources such as, but not limited to, direct report 110, satellite information 111, Internet information 112, wireless device 113, and emergency report 114. In the following discussion, the data in event database 150 includes prior collected data as well as data. In other words, the event information received at event database 150 may include initial information and any additional situational reports that may be received about or from within the area of interest.

In one embodiment, updated direct report 110 information may be received from the persons within or approximate to the area of interest. For example, a person within an area of interest can provide real time information about the area of interest. The information may include status information about the area of interest such as fire size, location, damage, structure issues, environmental conditions, etc.

Satellite information 111 may include satellite imagery, NSS positional information, global NSS (GNSS) positional information, satellite telephony information, satellite data information and the like.

Internet information 112 may include information collected from local web cameras, road cameras, security cameras, utility company information and status, social networking information such as images, videos, text messages and the like which may be uploaded to the Internet by a device within the area of interest or about the area of interest. In one embodiment, internet information 112 may include information collected via methods such as social-media data mining and the like. For example, one embodiment may monitor news reports or other audio or video media for the mention of key words. For example, media may be monitored for stories about the event.

In another embodiment, internet information 112 may utilize photo-recognition technology, text recognition, and the like to monitor Internet traffic. For example, a social website posting a photo or message reporting, and possibly geo-locating, a car accident, a tornado touch down, or the like. Upon recognition of such an event, internet information 112 would provide the information to event database 150.

Wireless device 113 information may include information collected from a phone call, a text message or a photo that was sent from a mobile device about the event. In one embodiment, the wireless device 113 information may be intercepted, recorded or copied for evaluation with respect to possible relevant information. For example, if a user was at the event and sent a photo of any damage, the photo may be utilized as information. Similarly, if the user made a phone call during the incident, the phone call may be reviewed for relevant information such as other personnel within the area, injuries, extent of damages, etc.

Emergency report 114 may be provided to event database 150 from medical facilities such as clinics, hospitals, emergency rooms, and the like; municipal dispatch information such as fire departments, police departments and the like; and municipal vehicle cameras, such as dashboard cameras, bus cameras and the like.

As described in more detail herein, in one embodiment, when an event is recognized, location and messaging controller 101 can communicate with one or more mobile communication tower(s) 105, communications satellites 155 and the like. In addition, mobile communication tower 105 and similarly communications satellite 155 may provide and receive signals 250. In one example, a mobile communication tower 105 is a cellphone tower that is capable of sending information to, and receiving information from, a mobile device.

Figure 2:
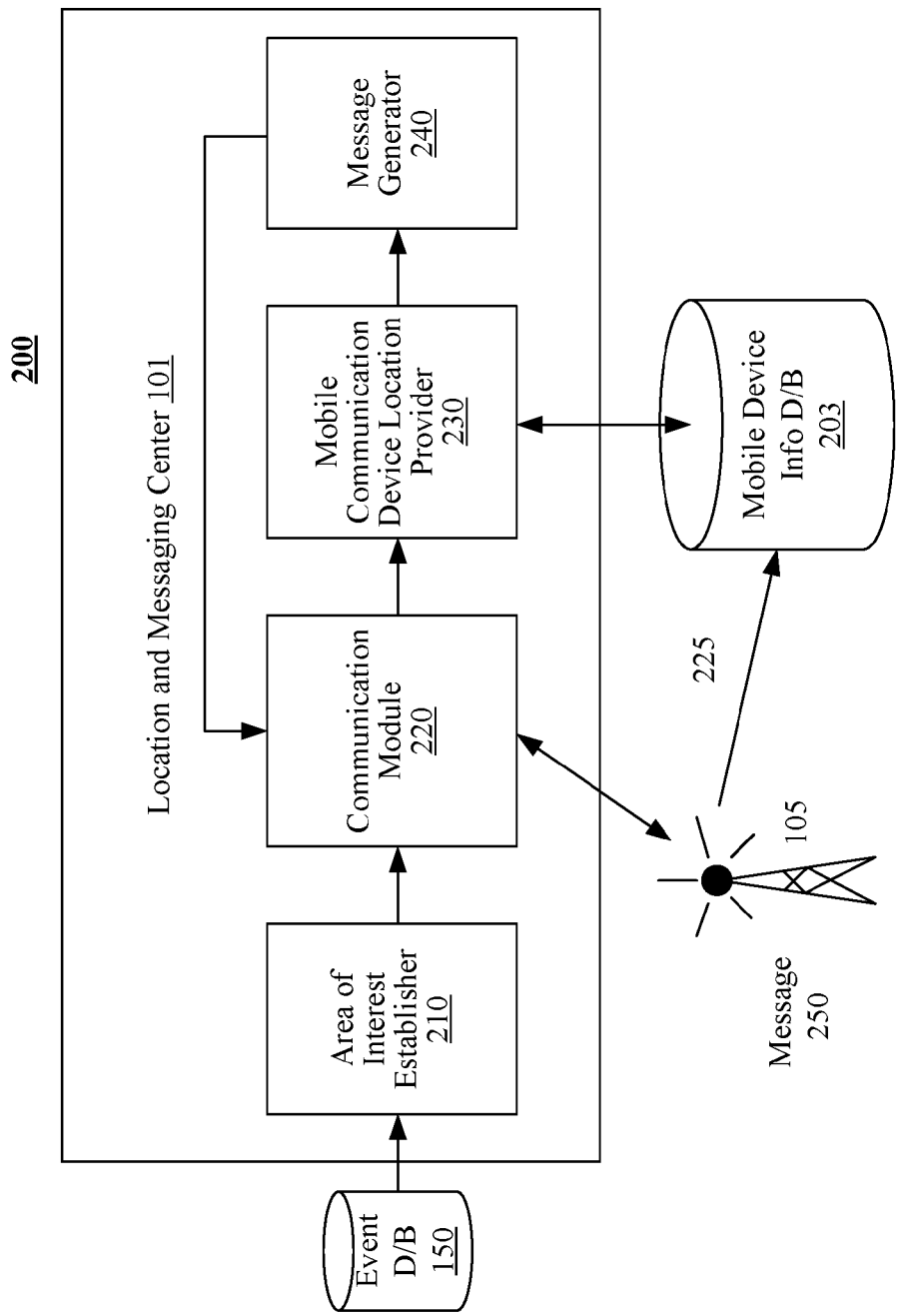
FIG. 2 is a block diagram of a location and messaging controller in accordance with an example of the present technology

With reference now to FIG. 2, a block diagram 200 of a location and messaging center 101 is shown in accordance with an example of the present technology. In one embodiment, the location and messaging center is similar to computing device 500 described in more detail below. Some actions described in the following example may be performed by a specific hardware component or collection of components. In another embodiment, certain processes are discussed that may be realized, in one embodiment, as a series of instructions that reside on a computer readable medium that may be executed by processor 502 of system 500. When executed, the instructions cause the computer system 500 to perform specific functions and exhibit specific behavior such as described herein.

In one embodiment, location and messaging center 101 includes an area of interest establisher 210, a communications module 220, a mobile communications device location provider 230 and a message generator 240. In addition, FIG. 2 includes an event database 150 and a mobile device information database 203. FIG. 2 also shows a communications tower 105 and a message 250.

Although FIG. 2 illustrates both an event database 150 and a mobile device information database 203. The illustration of two databases is provided for purposes of clarity. The technology is well suited to using only a single database or any number of databases. Further, the organization of the databases herein is representative of one example, provided for clarity. The actual organization of the database(s) may be context dependent, based on storage capacity, user preference, or the like.

In general, area of interest establisher 210 is utilized to generate an area of interest around an event. In general the area of interest is relative to an event such as an emergency, accident or the like. For example, in a contained event, such as a structure fire, the area of interest may be within a radius of the structure itself. However, in another embodiment, the area of interest may include a one block perimeter around the structure. In another example, the area of interest may be a roadway, traffic accident or the like.

Communications module 220 is utilized to communicate with any communications tower 105 that has a range that extends to the area of interest established by area of interest establisher 210. In one embodiment, communications module 220 may provide an information request to communications tower 105 for any mobile devices that are within a certain range of the event, area of interest, or the like. In one embodiment, any information from communications tower 105 would be collected at mobile device information database 203. In one example, communications tower 105 may provide the information directly to mobile device information database 203 via pathway 225. In another embodiment, communications module 220 may communicate with a communications satellite 155, or the like. In addition, communications module 220 may have a period of time after which the request is repeated. For example, a first information request may be made and then every 5 minutes another request may be made. Thus, the information at mobile device information database 203 is also continually updated throughout the event.

Location and messaging center 101 also includes mobile communication device location provider 230. In one embodiment, mobile communication device location provider 230 accesses mobile device information database 203 and provides a device location report and may also provide a visual representation of any mobile devices to a graphic user interface (GUI) or the like. For example, on a GUI having an overlay of a map of the region such as shown in FIG. 3.

In one embodiment, the information displayed on the GUI may be preference based and dynamically adjustable. For example, a rescue agency may want to see an uncluttered screen showing only mobile devices information within the area of interest or at the specific event location. In contrast, a subscription event avoidance service may want to see information for mobile devices that are approaching the area including, but not limited to, speed, direction of travel, possible routes for deviation, and other avoidance type data.

Message generator 240 is utilized to provide a message 250 that can be delivered to the mobile communications device. For example, one or more of the mobile devices shown by mobile communication device location provider 230 may be selected to receive a message described in more detail herein. Message generator 240 is utilized to generate message 250, e.g., type, content, information, etc. and then provide the message 250 to communications module 220 for delivery via the communications tower 105, communications satellite 155, or the like.

Figure 3:
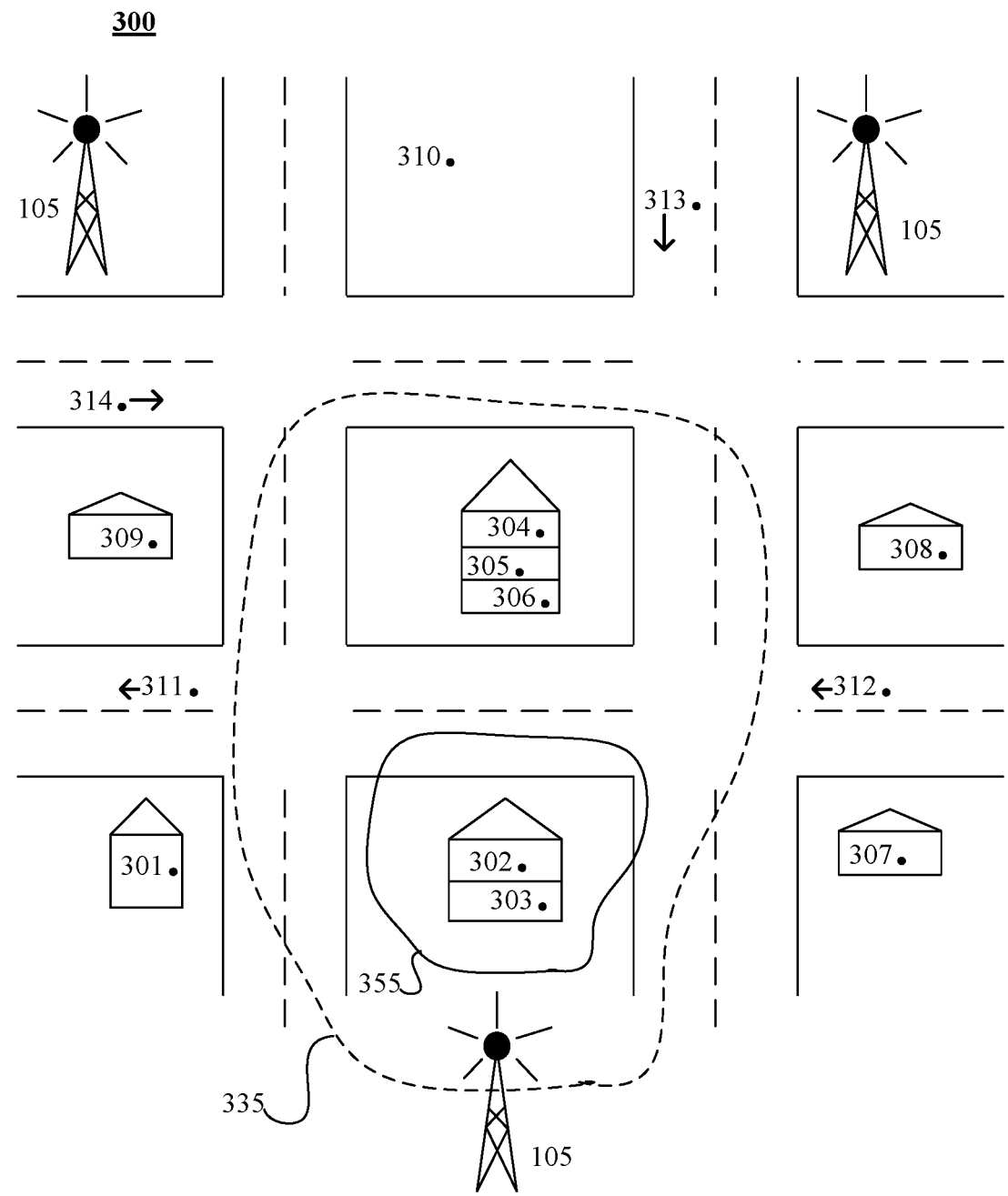
FIG. 3 is a diagram of a location including an area of interest in accordance with an example of the present technology.

With reference now to FIG. 3, a diagram 300 of a location including an area of interest in accordance with an example of the present technology. In one embodiment, diagram 300 may be printed onto a piece of paper, displayed on a GUI, or the like.

Although a number of roads, buildings, mobile devices and communications towers 105 are shown in diagram 300, they are exemplary. In other words, the present diagram 300 is merely one of a plurality of possible diagrams that may be generated. The use of diagram 300 herein is provided for clarity.

Diagram 300 includes 3 communication towers 105, mobile devices 301-313, a larger area of interest 335 and a smaller area of interest 355. In general, the term mobile communication device refers to a wireless communications device such as, but not limited to, a mobile phone, a PDA, a smart phone, a GPS, a camera, a car based location service, a GIS enabled vehicle and the like.

As stated herein, many people have a mobile communications device and they often carry or are located nearby the device. As such, in one embodiment of the present discussion, a mobile communications device may be considered as a marker for a person until it is proven otherwise.

Figure 4:
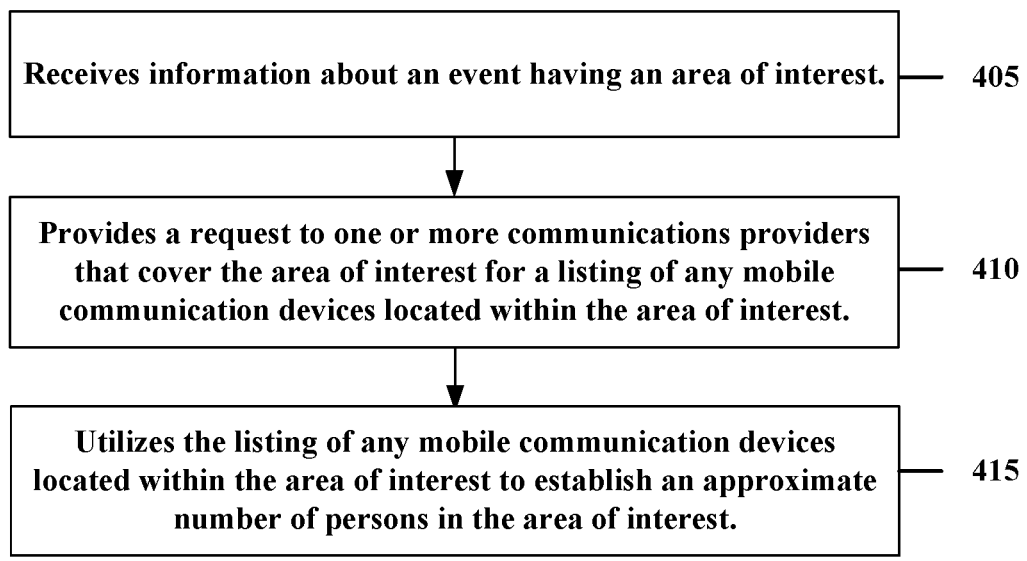
FIG. 4 is a flowchart of a method for providing information about mobile communication devices with respect to an area of interest in accordance with an example of the present technology.

With reference now to FIG. 4, a flowchart of a method for providing information about mobile communication devices with respect to an area of interest is shown in accordance with an example of the present technology.

With reference now to 405 of FIG. 4 and to FIG. 3, one embodiment receives information about an event having an area of interest. For example, in one embodiment, once an event is recognized and the area of interest is known, the collection of information begins.

With reference now to 410 of FIG. 4 and to FIG. 3, one embodiment provides a request to one or more communications providers that cover the area of interest for a listing of any mobile communications devices located within the area of interest. For example, the collection of information would include a request to one or more mobile towers that cover the area of interest for a listing of any or all mobile communication devices that are located within the area of interest. The information may be as minimal as the number of mobile communication devices within the area of interest or may be as specific as the location of each mobile communication devices within the area of interest and its owner.

In one embodiment, the information about the mobile devices is collected at mobile device information database 203 and location and messaging center 101 is utilized to access the mobile device information database 203 in conjunction with the event database 150 and filter the data for the desired information. For example, the initial area of interest 335 request to the tower may have covered a 4 block radius. The location and messaging center 101 may then work with the entire larger area of interest 335 or may filter the results to a smaller area of interest 355. For example, the initial request from the location and messaging center 101 may include a larger area of interest 335 that is larger than necessary to ensure that an appropriate safety margin has been met based on initial event information. However, once the event is better understood, the size of the area of interest may be significantly reduced such as shown by smaller area of interest 355.

However, in another embodiment, the initial area of interest may be too small and an update may include expanding the area of interest. For example, the initial area of interest may have been defined by smaller area of interest 355 and then, as the scope of the event is enlarged, the area of interest may be changed to a larger area of interest 335.

One method for delineating each area of interest is with the utilization of a geofence. In general, a geofence is a border or "fence" that is drawn on an electronic map presented on a graphical user interface (GUI). A geofence can be drawn around a certain event or an entire area of interest. Once it has been drawn on an electronic map, the geofence can be displayed on any number of devices such as, but not limited to, the control center GUI, mobile devices, a portable GNSS device, a vehicle mounted GNSS device, and the like.

By adjusting the size of the geofence with respect to the actual area of interest, and providing a specific asset travel distance past the geofence at which the alert is sent, the geofence becomes a firm boundary for an area of interest.

As stated herein, in one embodiment, the area of interest may be only a specific structure, for example, to attempt to gain a head count with respect to the number of mobile devices within a building that is on fire. However, in another embodiment, the area of interest may be the entire block to help the command element maintain situational awareness, account for mobile devices that may be unknowingly entering the damaged structure or mobile devices that are within a danger area with respect to things that may fall from, spread from or otherwise cause further casualties.

In another embodiment, the location and messaging center 101 may request additional information to be collected at event database 150. For example, as described herein, the additional information for the area of interest may include Internet information, car based location services information, emergency response information, satellite imagery, web cameras, road cameras, security cameras, utility company information and status, social networking information about the area of interest such as images, videos, text messages and the like which may be uploaded to the Internet, information sent from or to any mobile communications device determined to be within the area of interest or about the area of interest, and the like. Further, in one embodiment information about response capabilities, such as available fire, police and ambulance responders, and the like may also be gathered.

With reference now to 415 of FIG. 4 and to FIG. 3, one embodiment utilizes the listing of any mobile communication devices located within the area of interest to establish an approximate number of persons in the area of interest. Further, the real time information may include detour information, no entry information, and egress information for persons that may be approaching the area of interest.

For example, with respect to FIG. 3, a first area of interest 335 has been generated based on an event. The communications tower 105 provides the location of mobile communication devices 301-313. From FIG. 3, it is apparent that only mobile communication devices 302-306 are within the first area of interest 335. However, as the location information is updated to account for speed or direction of any mobile communication devices, it is also noted that mobile communication devices 312-314 are approaching the first area of interest 335 while mobile communication devices 301 and 307-309 are in stationary locations outside of first area of interest 335.

When the area of interest is reduced to second area of interest 355 only mobile communication devices 302 and 303 remain within second area of interest 355. Based on the location information, a response to an event within second area of interest 355 would provide a rescue worker with the probable location of at least two persons. In one embodiment, the location information may be two dimensional. However, in another embodiment, the location information may be three dimensional, such as from a mobile device with GNSS capabilities.

In one embodiment, by utilizing the provided listing of mobile communication devices within an area of interest, response requirements can be generated. For example, based on the probable number and location of personnel within the area of interest, immediate response needs such as people in need of rescue, number of rescuers needed, type of rescuers needed, number of response vehicles needed, type of response vehicles needed can be established. Further, the architecture for the response may utilize the provided and updated information to assist in generation of alternate routes, contingency plans, road closures, first aid needs, and the like. In addition the architecture for the response may include developing contingency plans based on the environment surrounding the area of interest, and the like.

In addition, in one embodiment, a message may be provided from the location and messaging center 101 to each mobile communications device within the area of interest. In one embodiment, the message may be a blanket message. In other words a message that is sent to every mobile communications device within the area of interest. The message may be a text message, voice message, multimedia message, or the like.

In one embodiment, the message may be a non-responsive message such as a message that provides instructions, directions, or actions for the mobile communications device user. For example, the message may provide information about what the user should expect, such as the timeframe for rescue. In another example, the message may provide general guidance information to the user with respect to how to safely depart the area of interest, what safety precautions should be taken, a gathering location, instructions, directions, event specific advice, action plans, and the like for the persons within the area of interest. Although one message is stated herein, there may be more than one blanket message sent. Such as updated information and the like. Further, at later times, blanket messages may not be sent to all devices, instead some devices may receive one message while devices in other locations may receive different messages. This distinction may be based on location, updated information, or the like.

Further, a secondary message may be provide to each mobile communications device that may be approaching the area of interest or that are within the area of interest but outside of the event perimeter. In general, the secondary message may include detour information, no entry information, and egress information for persons.

In one embodiment, the first message, or any additional messages, may include a response request. For example the request could be for information confirming the identity of the user of the mobile communications device, the specific location of the user, any other persons that are with the user, and the like.

In addition, in one embodiment remote activation of the mobile device's GPS or other location specific information may be performed by an automated command. In addition, in one embodiment, contact information may be accessed from the mobile device or from the account of the mobile device. For example, alternate contact numbers and home/work address information may be obtained.

Further, as stated herein, in one embodiment, any information provided by mobile communication devices within the area of interest during the time of interest may be gathered. Provided information may include, but is not limited to, a phone call, text message or photo that was sent from the mobile device during the time of interest. In one embodiment, the provided information may be intercepted, recorded or copied for evaluation with respect to possible relevant information. For example, if a user was at the area of interest and sent a photo of any damage, the photo may be utilized as information. Similarly, if the user made a phone call during the incident, the phone call may be reviewed for relevant information such as other personnel within the area, injuries, extent of damages, etc.

Furthermore, provided information may include personal information such as, but not limited to, injury information, number and location of other people within the area of interest, special needs information, any immediate needs, any short term needs, perceived level of danger, requests for medical guidance, contact information for others persons that may be unaccounted for or out of contact, and the like.

By utilizing the foundation of knowledge, such as known personnel location and situational report information, architecture for an enhanced and appropriately prepared response can be built. Similarly, when the mobile device has departed the area of interest, notations, alerts, direct contact or the like may be utilized to confirm the user of the mobile device is clear of the area thereby removing the person(s) from any further immediate response needs.

In another embodiment, the technology described herein may be utilized in a subscription type service. For example, instead of providing location information to a rescuer, location and messaging center 101 may monitor an area of interest and provide information to any subscribers that will inform the subscriber about the event. Moreover, the technology may also provide direction to help the subscriber avoid the area of interest, depart the area of interest, or the like.

In one embodiment, the subscription service may remove personally identifiable information about a user when requesting information useful to the requester. For example, if an area of interest was in the Center for Treating Unhealthy Fascination with Rubber Duckies, location information such as 17 people are on the 8th floor of the CTUFRD may be provided, but identifying information such as caller ID information, the phone number and any other account information that could be used to identify the user specifically may be redacted.

In general, the subscription type service may include a number of different features and aspects. In one embodiment, the subscription may be an opt-in service. For example, a user would actively sign up for the service, with a default assumption that their phone would not be participating. In another embodiment, the subscription type service may be an opt-out service. For example, a user is presumed to be participating unless they have specifically refuse participation. In another embodiment, the subscription type service may include both opt-in and opt-out characteristics based on service plans, user status or the like. For example, a government employee on the clock may be part of the opt-out service plan, while a civilian may be opt-in.

For example, as shown in FIG. 3, mobile communication devices 312-314 are approaching the first area of interest 335. In the following example, mobile communication device 313 is a subscriber to the service and mobile communication devices 312 and 314 are not. As such, mobile communication device 313 would receive a message alerting the user of the first area of interest 335. The message may include information about the event, about the first area of interest 335, detour information, reroute information, and the like. Thus, the user of mobile communication device 313 would be able to take action to avoid being caught up in the event or even traffic within the first area of interest 335. In so doing, time may be saved and possible hazard may be avoided. Similarly, since mobile communication devices 312 and 314 are not subscribers, and since they are outside of the first area of interest 335, they would not find out about the event until they entered first area of interest 335 and were then possibly exposed to the hazard, delayed by traffic, or the like.

Although FIG. 3 illustrates a city or town type scenario, the present technology is well suited to any type of event and notification. For example, the event may be an accident, a road closure, a road repair, a speed trap or other event on a roadway.

In one example, the range for warning a subscriber may be enlarged such that a subscriber may receive the event message in time to take a different route or otherwise avoid the crash and any associated traffic delays. In other words, a buffer zone around the area of interest for the event to provide enough time for the broadcast message to be received prior to the subscriber's mobile communications device entering the area of interest to be avoided.

As stated herein, in one embodiment the message is a situational report about the event and/or area of interest. For example, the situational report may include event information such as, but not limited to, location, damage, structure issues, road conditions, and environmental conditions. In addition, as described herein, the subscriber service location and messaging center 101 may access one or more sources of information about the event such as the information described in detail in FIG. 1.

Further, in one embodiment, the subscription service may provide updates about the area of interest and/or the event based on any update to the situational report. For example if the area of interest changed from a first area of interest 335 to a second area of interest 355, an updated message may be broadcast to the subscriber's mobile communications device.

Example Computing System

Figure 5:
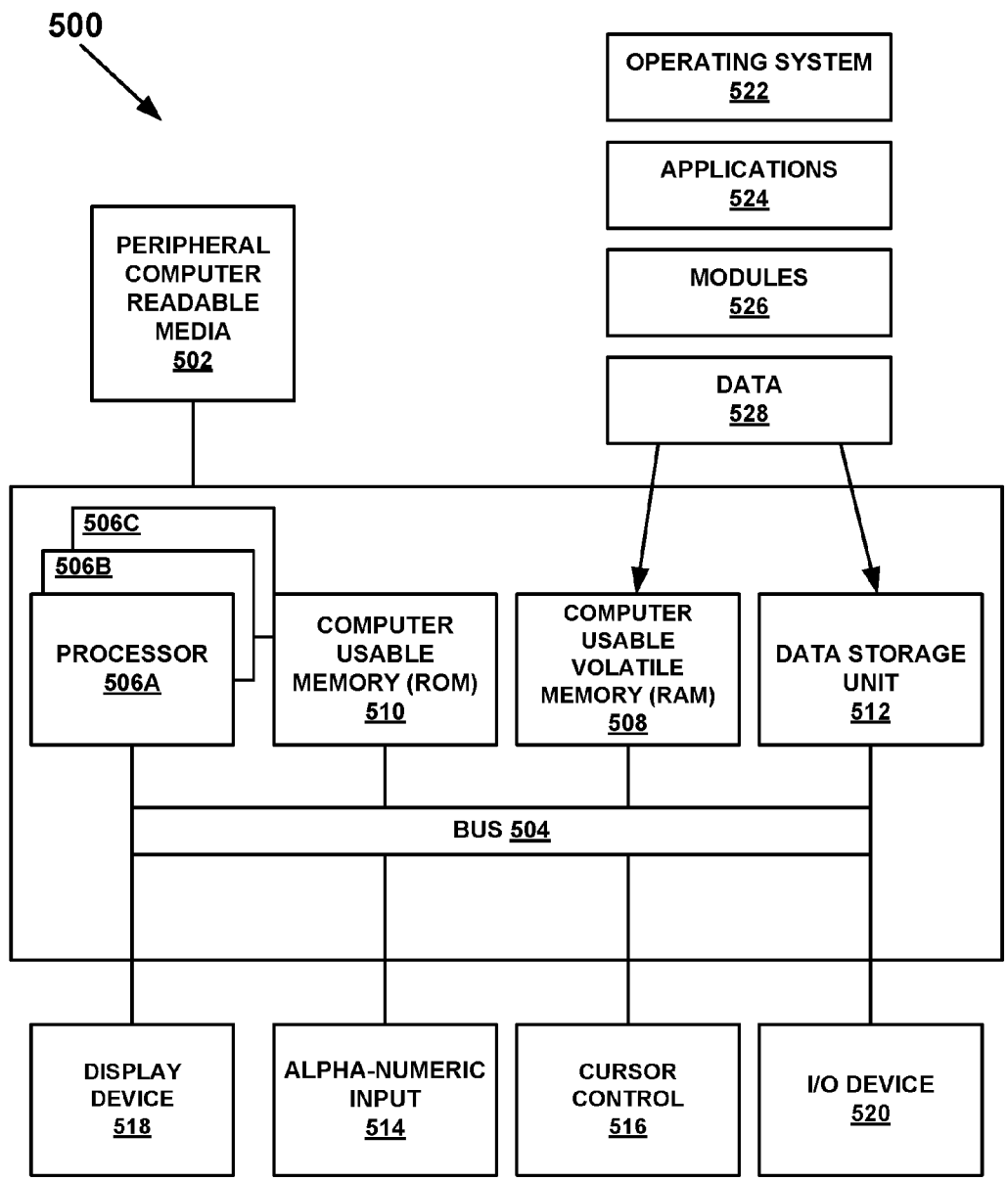
FIG. 5 is a block diagram of a computer system in accordance with one embodiment of the present technology.

With reference now to FIG. 5, portions of the technology may be composed of computer-readable and computer-executable instructions that reside, for example, on computer-usable media of a computer system. FIG. 5 illustrates an example of a computer system 500 that can be used in accordance with embodiments of the present technology. However, it is appreciated that systems and methods described herein can operate on or within a number of different computer systems including general purpose networked computer systems, embedded computer systems, routers, switches, server devices, client devices, various intermediate devices/nodes, standalone computer systems, and the like. For example, as shown in FIG. 5, computer system 500 is well adapted to having peripheral computer readable media 502 such as, for example, a floppy disk, a compact disc, flash drive, back-up drive, tape drive, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors.

System 500 also includes data storage features such as a computer usable volatile memory 508, e.g. random access memory (RAM) (e.g., static RAM, dynamic, RAM, etc.) coupled to bus 504 for storing information and instructions for processors 506A, 506B, and 506C. System 500 also includes computer usable non-volatile memory 510, e.g. read only memory (ROM) (e.g., read only memory, programmable ROM, flash memory, EPROM, EEPROM, etc.), coupled to bus 504 for storing static information and instructions for processors 506A, 506B, and 506C. Also present in system 500 is a data storage unit 512 (e.g., a magnetic or optical disk and disk drive, solid state drive (SSD), etc.) coupled to bus 504 for storing information and instructions.

System 500 also includes an alphanumeric input device 514 including alphanumeric and function keys coupled to bus 504 for communicating information and command selections to processor 506A or processors 506A, 506B, and 506C. System 500 also includes a cursor control device 516 coupled to bus 504 for communicating user input information and command selections to processor 506A or processors 506B, and 506C. System 500 of the present embodiment also includes a display device 518 coupled to bus 504 for displaying information. In another example, alphanumeric input device 514 and/or cursor control device 516 may be integrated with display device 518, such as for example, in the form of a capacitive screen or touch screen display device 518.

Referring still to FIG. 5, optional display device 518 of FIG. 5 may be a liquid crystal device, cathode ray tube, plasma display device or other display device suitable for creating graphic images and alphanumeric characters recognizable to a user. Cursor control device 516 allows the computer user to dynamically signal the movement of a visible symbol (cursor) on a display screen of display device 518. Many implementations of cursor control device 516 are known in the art including a trackball, mouse, touch pad, joystick, capacitive screen on display device 518, special keys on alpha-numeric input device 514 capable of signaling movement of a given direction or manner of displacement, and the like. Alternatively, it will be appreciated that a cursor can be directed and/or activated via input from alphanumeric input device 514 using special keys and key sequence commands. System 500 is also well suited to having a cursor directed by other means such as, for example, voice commands, touch recognition, visual recognition and the like. System 500 also includes an I/O device 520 for coupling system 500 with external entities. For example, in one embodiment, I/O device 520 enables wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512.

Example NSS Receiver

Figure 6:
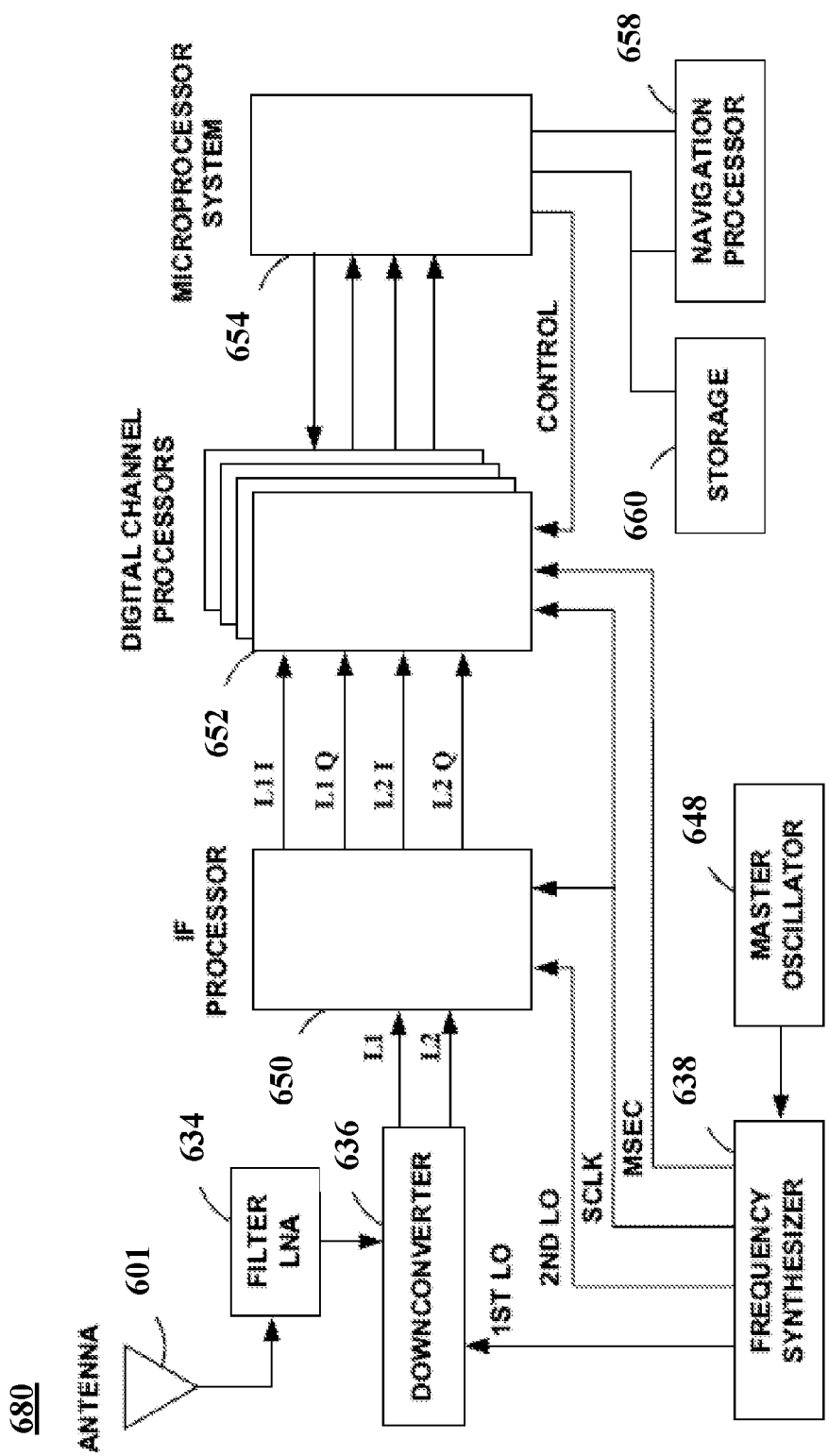
FIG. 6 is a block diagram of an example navigation satellite system (NSS) receiver which may be used in accordance with one embodiment of the present technology.

With reference now to FIG. 6, a block diagram is shown of an embodiment of an example NSS receiver which may be used in accordance with various embodiments described herein. In particular, FIG. 6 illustrates a block diagram of a GNSS receiver in the form of a general purpose GPS receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion. Although an embodiment of a global NSS receiver and operation is described herein, the technology is well suited for use with numerous other NSS signals including L5 signal(s), Glonass signal(s), Galileo signal(s), Compass signal(s), various SBAS systems signal(s), and the like.

Embodiments of the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Embodiments of the present invention are thus described. While the present invention has been described in numerous embodiments, the foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application.

What is claimed is:

1. A method for establishing an approximate number of persons in an area of interest, the method comprising:
providing a request to one or more communications providers that cover an area of interest for a listing of any mobile communication devices located within the area of interest; and
utilizing the listing of any mobile communication devices located within the area of interest to establish an approximate number of persons in the area of interest; and
responsive to receipt of information that indicates a mobile communication device on the listing has departed the area of interest, updating the listing to show the mobile communication device is clear of the area of interest.

2. The method of claim 1, wherein the request to one or more communications providers further comprises:
requesting a location of each mobile communication device within the area of interest.

3. The method of claim 1, further comprising:
providing a non-responsive broadcast message to each mobile communication device within the area of interest, the broadcast message including information selected from the group consisting of: an instruction, an egress route, an action plan, a safety precaution, a gathering location, and event specific advice for an event within the area of interest.

4. The method of claim 1, further comprising:
providing a request for user information to each mobile communication device within the area of interest, the request consisting of: a user identity confirmation, a specific location, and a list of any other persons with a user.

5. The method of claim 1, further comprising:
providing a command to each mobile communication device within the area of interest to initiate location capabilities.

6. The method of claim 1, further comprising:
providing a command to each mobile communication device within the area of interest to activate WiFi to enable additional communications activities.

7. The method of claim 1, further comprising:
including a safety margin border in an initial area of interest for an event in the area of interest.

8. The method of claim 7, further comprising:
updating the area of interest for an event in the area of interest; and
generating a new request to the one or more communications providers for a listing of any mobile communication devices located within the updated area of interest.

9. The method of claim 1, further comprising:
receiving at least one situational report from within the area of interest for an event in the area of interest, the situational report consisting of event information selected from the group consisting of: location, damage, structure issues, road conditions, and environmental conditions.

10. The method of claim 1, further comprising:
receiving at least one status report from within the area of interest, the status report consisting of personal information selected from the group consisting of: an injury information, a number of other people within the area of interest, a location of other people within the area of interest, a special need, an immediate need and a contact information for one or more other unaccounted for persons.

11. The method of claim 1, further comprising:
accessing one or more other sources of information with respect to the area of interest, the sources of information selected from the group consisting of: Internet, a car based location service, AM/FM radio, television, satellite imagery, a web camera, a road camera, a security camera, a utility company, municipal services dispatch information and municipal vehicle cameras.

12. The method of claim 1, further comprising:
accessing any information sent from or to any mobile communication device within the area of interest; and
evaluating the information for event information for an event in the area of interest.

13. The method of claim 1, further comprising:
generating a request to one or more communications providers that cover the area of interest for a listing of any mobile communication devices approaching the area of interest; and
providing a warning message to each mobile communication device approaching the area of interest, the warning message selected from the group consisting of: a detour, an approach-no-closer-than location, and egress information.

14. The method of claim 1, further comprising:
instructing the one or more communications providers to prioritize communication to the mobile communication devices located with the area of interest.

15. A method for providing information to mobile communication devices with respect to an area of interest, the method comprising:
providing a request to one or more communications providers that cover an area of interest for a listing of any mobile communication devices located within the area of interest and a second listing of any mobile communication devices approaching the area of interest;
providing a broadcast to each mobile communication device on the listing; and
providing a warning message to each mobile communication device approaching the area of interest.

16. The method of claim 15, wherein the broadcast is selected from the group consisting of: a non-responsive broadcast message which includes information for users of mobile communication devices on the listing; a broadcast request for user information from the users of mobile communication devices on the listing; and a broadcast command to mobile communication devices on the listing to initiate location capabilities.

17. The method of claim 15, wherein said providing a warning message to each mobile communication device approaching the area of interest comprises:
providing the warning message to each mobile communication device approaching the area of interest, wherein the warning message is selected from the group consisting of: a detour, an approach-no-closer-than location, and egress information.

18. An event location configuration and messaging system comprising:
a communication system and process to request a listing of mobile communication devices located within an area of interest from one or more communications providers that cover the area of interest, the listing incorporated in a database;
a mobile communication device location provider with access to the listing in the database and configured to obtain and provide locations of mobile communication devices on the listing, wherein when a mobile communication device on the listing departs the area of interest said system updates said listing to show the mobile communication device is clear of the area of interest; and
a message generator to generate a message based on an event within the area of interest, the message provided via a communication module to the one or more communications providers for delivery to mobile communication devices on the listing and within the area of interest.

19. The event location configuration and messaging system of claim 18, wherein the message generator generates a first message for any mobile communication device of the listing that is in a first location and a second message for any mobile communication device of the listing that is in a second location, the second message different from the first message.

20. The event location configuration and messaging system of claim 18, wherein the mobile communication device is selected from the group consisting of: a mobile phone, a Personal Digital Assistant (PDA), a smart phone, a Navigation Satellite System (NSS) receiver, and a car based location service.

* * * * *